United States Patent
Chanrai et al.

(10) Patent No.: US 6,780,321 B2
(45) Date of Patent: Aug. 24, 2004

(54) RECOVERY OF OIL FROM SPENT BLEACHED EARTH

(75) Inventors: Narain Girdhar Chanrai, Singapore (SG); Santosh Gajanan Burde, Johor (MY)

(73) Assignee: Kewalram Oils SDN GHD (MY)

( * ) Notice: Subject to any disclaimer, the term of this patent is extended or adjusted under 35 U.S.C. 154(b) by 58 days.

(21) Appl. No.: 10/188,810

(22) Filed: Jul. 5, 2002

(65) Prior Publication Data
US 2003/0201228 A1 Oct. 30, 2003

(30) Foreign Application Priority Data
Apr. 17, 2002 (MY) .................................. PI 2002 1409

(51) Int. Cl.$^7$ ............................................. B01D 11/00
(52) U.S. Cl. ................. 210/634; 210/768; 210/774; 210/804; 210/806; 426/429; 554/20; 554/21; 554/177
(58) Field of Search ............................. 210/634, 768, 210/770, 774, 804, 806; 426/429, 601; 554/12, 20, 21, 13, 175, 177

(56) References Cited

U.S. PATENT DOCUMENTS

| | | | | |
|---|---|---|---|---|
| 2,328,158 A | * | 8/1943 | Martin ........................ 502/31 |
| 2,416,196 A | * | 2/1947 | Mortenson ................... 554/177 |
| 2,509,509 A | * | 5/1950 | Leaders et al. ............. 554/180 |
| 2,548,434 A | * | 4/1951 | Leaders ........................ 554/16 |
| 2,577,709 A | * | 12/1951 | Gee ............................ 106/239 |
| 5,358,915 A | * | 10/1994 | Nebergall et al. ............. 502/27 |
| 5,599,376 A | * | 2/1997 | Camp ........................ 75/10.65 |

* cited by examiner

Primary Examiner—Joseph Drodge
(74) Attorney, Agent, or Firm—Lowe Hauptman Gilman & Berner LLP

(57) ABSTRACT

The invention discloses a process to recover oil from spent bleaching earth recovered from vegetable oil refining process. The process involve three sub-processes comprising of reacting the spent bleaching earth with a solvent selected from a group consisting of toluene, acetone, xylene, isopropyl alcohol or n-hexane at a temperature between 35° C. to 50° C.; separating the solids and liquid from slurry formed in the previous step; and extracting oil from the liquid fraction obtained in the previous step. The separation of the solids and the liquid from slurry can be formed in two steps. The slurry mixture of solids and liquid is first separated into a solid fraction and a liquid fraction. The solid fraction so separated still contains a significant portion of oil. Therefore the solid fraction is reacted with some solvent. The next slurry of solids and liquids is again separated into a solid fraction and a liquid fraction.

17 Claims, 2 Drawing Sheets

Fig I

RECOVERY OF OIL FROM SPENT BLEACHED EARTH

FIELD OF INVENTION

The present invention relates to a process of recovery of oil for spent bleached earth. More particularly the invention relates to the recovery of palm oil from spent bleached earth or clay.

BACKGROUND ART

Spent bleaching earth is a solid waste material generated as part of the refining process in the vegetable oil industry worldwide. A typical vegetable oil refining process involved pretreatment of crude vegetable oil such as palm oil with phosphoric acid, followed by bleaching deodorization. The purifying treatment is designed to remove undesired free fatty acids, phophatides, glycerides, sterols, tocopherols, resinous and mucilaginous materials from the crude palm oil. Bleaching is done solely to reduce the colour of the oil and is done using bleaching earth or clay. This process is followed by deodorization, which is intended primarily for the removal of traces of constituents that give rise to flavours and odors.

The most common adsorbent used for bleaching is the bleaching earth or clay. Naturally occurring bleaching earth is bentonite or montmorillonite clay which when acid activated with sulfuric acid increases adsorption capacity. After the treatment of crude oil with phosphoric acid, the oil is treated with bleaching earth, which adsorbs the impurities. Subsequently the treated oil is separated from the bleaching earth by filtration mostly in batches. The spent bleaching thus separated from the oil contains gums and impurities along with significant amount of oil.

It is not economical to recover the oil from the spent bleaching earth due to the small amounts of bleaching for individual oil refineries. In some countries it is generally a practice to dispose of the spent bleaching earth in landfills where else in some other countries it is treated as hazardous and is disposed off accordingly as hazardous waste.

In countries or regions where the palm oil industry is very large there is large amount of spent bleaching earth generated in the refining of crude palm oil process. Thus there is a need for a process to recover the oil in the spent bleaching earth in an economical manner before disposing of the spent bleached earth.

SUMMARY OF THE INVENTION

The invention discloses a process to recover oil from spent bleaching earth recovered from vegetable oil refining process. Although the example described in this invention refers to palm oil, the technology can equally be used in the extraction of other vegetable oil from spent bleaching earth used in the refinery process of other vegetable oils, such as soyabean oil, peanut oil, sunflower oil, etc. The process involves three sub-processes comprising of reacting the spent bleaching earth with a solvent selected from a group consisting of toluene, acetone, xylene, isopropyl alcohol or n-hexane at a temperature between 35° C. to 50° C.; separating the solids and liquid from slurry formed in the previous step; and extracting oil from the liquid fraction obtained in the previous step. The separation of the solids and the liquid from slurry can be formed in two steps. The slurry mixture of solids and liquid is first separated into a solid fraction and a liquid fraction. The solid fraction so separated still contains a significant portion of oil. Therefore the solid fraction is reacted with some solvent. The next slurry of solids and liquids is again separated into a solid fraction and a liquid fraction.

More particularly the invention described a process where spent bleaching earth from crude palm oil refinery process is reacted with n-hexane at a temperature between 35° C. to 50° C. in an agitated reactor for about 15 to 45 minutes. The reaction in the agitated reactor allows the dissolution of oil into the solvent. The slurry concentration in the agitator is maintained between 5% to 50% weight. The slurry thus formed is led to gravity settlers having plates for settling of solids.

The thicker slurry from the settlers is then introduced to vacuum belt filter for separation of the clay/bleaching earth and miscelle. Alternatively the slurry from the agitator reactor can be filtered in porous metal filters in two stages to improve efficiency. About 30% to 35% by weight of slurry from agitator is fed to the porous metal filter to get a clear filtrate and a cake with 70% to 75% dryness. This separated cake is ten remixed with fresh and/or recycled hexane to recover further absorbed oil from the cake in another agitator reactor. The slurry from this agitator is then again separated in another porous metal filter to obtain deoiled bleaching earth with about 3% to 5% oil content.

The filtrate or the miscella from the settlers/porous metal filters is than distilled in a distillation plant, which is a combination of rising film and fall film evaporators. The n-hexane distilled off is condensed in condensers and recycled back for processes. The extracted oil is further sent to refining to remove free fatty acids (FM) in a normal deodorizer system. The spent bleaching earth after removal of significant portion of the oil is the desolventized in a loop system using steam to recover left over solvent. This process condition is maintained between 80° C. to 110° C. to ensure complete removal of solvent before being fed to the incinerator system.

DETAILED DESCRIPTION OF THE DRAWINGS

The invention will now be described in detail by reference to preferred embodiments by way of example only and to the following drawings in which.

DETAILED DESCRIPTION OF THE INVENTION

Figure 1:
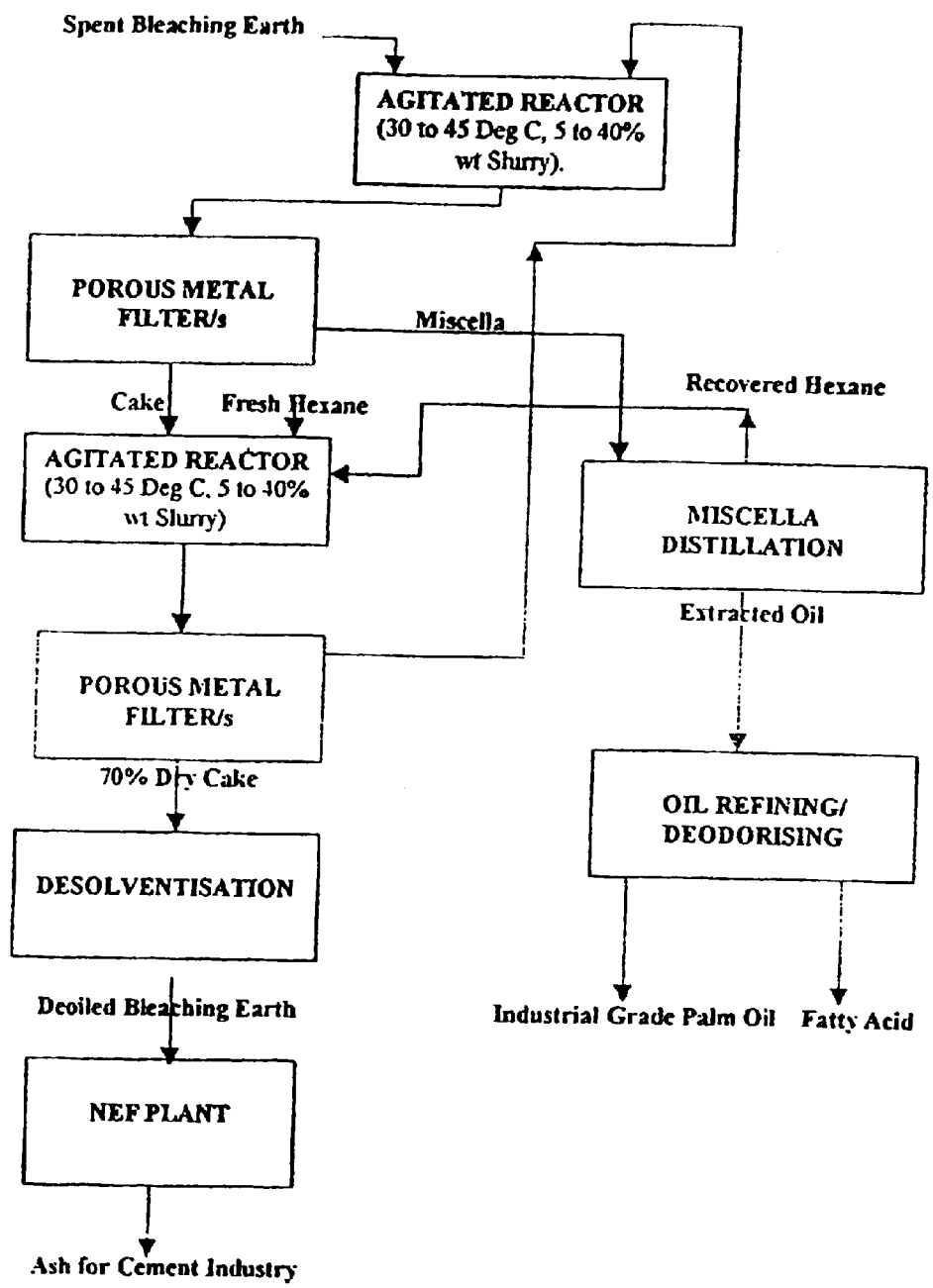
FIG. 1 shows a block diagram of a process according to the present invention.
Figure 2:
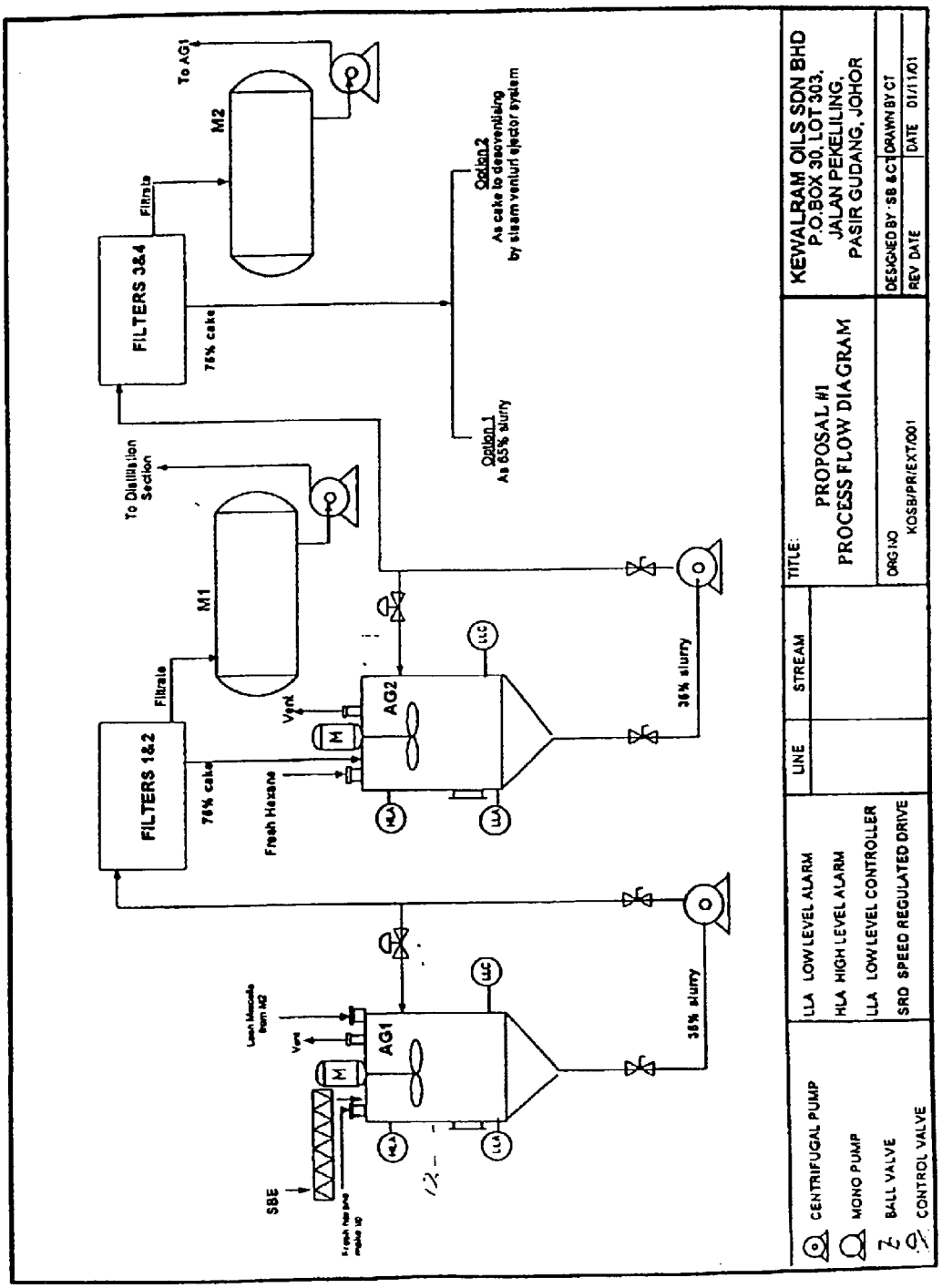
FIG. 2 shows a flow diagram of an extraction plant

A preferred embodiment of the invention will now be described with reference to FIGS. 1 and 2.

The commercial process for the recovery of oil from spent bleaching earth includes reacting spent bleaching earth such as bentonite or montmorillonite clay with solvents such as acetone, tuolene, xylene, isopropyl alcohol or n-hexane at a temperature range between 35° C. to 50° C. in an agitated reactor for about 15 to 45 minutes. It is preferred that n-hexane be used as the solvent and the operating temperature is 45° C. and the reaction time within the agitated reactor vessel (10) is 30 minutes. The reaction in the agitated reactor vessel (10) allows the dissolution of oil in the bleaching earth into the solvent. Typically the slurry concentration in the agitator vessel (10) is maintained between 5% to 50% by weight, ideally between 30% to 35% ww. This level in the agitator vessel (12) is maintained by re-circulation of part of the slurry. The slurry thus formed is led to gravity settlers (12) having plates for settling of solids. Thus the solids are separated from the miscella (solution of oil in solvent). The settlers (12) are operated with controlled feed rates to suit individual capacity and to ensure that the overflow is clear of solids and to ensure that the underflow is about 45% to 65% solids by weight. The operating conditions may vary from time to time depending on the solids characteristics. Hence the gravity settlers (12) need to be drained from time to time.

The thicker slurry from the gravity settlers (12) is then led to a vacuum belt filter (14) for separation of the clay/bleaching earth and the miscella. This vacuum belt filters can be used in combination with gravity type settlers. Alternatively the said settlers and belt filters can be replaced by the use of static porous metal filters under pressures of 1 to 4 bars. Preferably the filtration can be done using the static porous metal filters in two stages to improve efficiency. About 30% to 35% by weight of slurry from agitator is fed to the porous metal filters to obtain a clear filtrate and a cake of about 70% to 75% dryness. This separated cake is then remixed with fresh and/or recycled hexane to recover further adsorbed or remaining oil from the cake in another agitated reactors vessel. The slurry from this agitator is then again separated in another porous metal filter to obtain deoiled bleaching earth with about 3% to 5% oil content.

The filtrate or the miscella from the settlers/vacuum belt filter/porous metal filters is then distilled in a distillation plant, which is a combination of rising film and falling film evaporators. The hexane, which is distilled off is condensed in condensers and recycled back for process. The extracted oil is sent for refining to remove the free fatty acids (FFA) in a normal deodorizer system. The spent bleaching earth after removal of significant portion of oil is then desolventised in a loop system, using steam to recover leftover solvent. The process conditioners are maintained between 80° C. to 110° C. to ensure complete removal of solvent. The resultant bleached earth cake is disposed off.

It is environmentally safe enough to be disposed in landfills. In another aspect the resultant bleached earth (the deoiled bleached earth) is used as fuel in the incinerator system in the plan itself. The organic content remaining in the deoiled bleached earth is burnt off leaving anhydrous clay as residue. The anhydrous clay is advantageously used as raw material in other industries, such as the cement manufacturing industry.

The inventors carried out research trials to identify other suitable solvents that can be used commercially in the extraction of the maximum percentage of oil from the spent bleaching earth (SBE) whilst at the same time without deteriorating final oil quality. SBE was mixed with selected solvent to make 35% solid concentration in slurry form. The slurry was agitated using a magnetic stirrer for 15 minutes at 40° C. to 45° C. After 15 minutes, the slurry was filtered in which the cake of 75% dryness was separated from the clear filtrate. The percentage oil in the filtrate was analyzed whereas the cake was kept for second stage washing.

In the second stage extraction, sufficient amount of the same solvent as used in the first stage extraction was added into the wet cake from the first stage washing to provide 35% solid concentration. The temperature and time of mixing was maintained the same as in the first stage. The slurry was then filtered. The filtrate and wet cake were analyzed for oil content. The above described procedure was repeated using same lot and quantity of SBE but with different solvent.

The result of the analysis is given below in Table 1.

TABLE 1

| Solvent Used | 1st Stage Extraction | | 2nd Stage Extraction | | | Filtrate and cake appearance |
|---|---|---|---|---|---|---|
| | % solid | % oil in filtrate | % solid | % oil filtrate | % oil in cake | |
| Toluene | 35 | 16.78 | 35 | 3.1 | 1.39 | Filtrate: Reddish colour and higher than hexane filtrate Cake: Dark grayish |
| Acetone | 35 | 25.01 | 35 | 4.32 | 1.30 | Filtrate: Dark black filtrate Cake: Grayish |
| Hexane | 35 | 19.50 | 35 | 3.52 | 3.60 | Filtrate: Lighter colour than toluene filtrate Cake: Grayish |
| IPA (Iso Propyl Alcohol | 35 | 17.83 | 35 | 3.23 | 3.02 | Filtrate: Dark colour but lighter than acetone filtrate Cake: Grayish |

From the analysis results as shown in Table 1, it is evident that the best solvent to extract maximum oil from SBE in decreasing order is:—

Acetone>Tuolene>IPA>Hexane.

However in terms of filtrate and oil colour the best solvent was still produced by using hexane. Oil quality (colour) in decreasing order is:—

Hexane>Tuolene>IPA>Acetone.

The research findings show that hexane is still the most suitable solvent to use in extracting oil from SBE.

The inventors have found that the use of porous metal filters as compared to vacuum belt filter produces better efficiency of extraction of oil from SBE.

The palm oil extracted from SBE utilizing the method described above yields a refined, degummed and deodorized oil with the typical specifications as shown in Table 2.

TABLE 2

| | | Slurry Making | | | | | | | Reslurry | | | | | | |
|---|---|---|---|---|---|---|---|---|---|---|---|---|---|---|---|
| | | | Mixing | | | Filter | | | Mixing | | % oil | Filter | | | |
| E/O | SBE Oil | % Conc | time (min) | Solvent Used | % Oil in misc | % dry | Cake oil | Efficiency | % Conc | time (min) | Solvent Used | in misc | % dry | Cake oil | Efficiency | Remarks |
| 1 | 26.39 | 35 | 10 | FH | 21 | 75 | 7.42 | 77.64 | 35 | 10 | FH | 5.4 | 75 | 3.66 | 89.40 | |
| 2 | 22.91 | 35 | 10 | 0.9 @ oil miscella | 19.89 | 75 | 7.8 | 71.53 | 35 | 10 | FH | 6.92 | 75 | 3.35 | 88.34 | |
| 3 | 22.91 | 35 | 10 | 0.9 @ oil | | | | | | 10 | FH | 8.93 | 65 | 6.77 | 75.57 | |

TABLE 2-continued

| | | Slurry Making | | | | | | | | Reslurry | | | | | | |
| | | Mixing | | | | Filter | | | Mixing | | | % oil | Filter | | | |
| E/O | SBE Oil | % Conc | time (min) | Solvent Used | % Oil in misc | % dry | Cake oil | Efficiency | % Conc | time (min) | Solvent Used | in misc | % dry | Cake oil | Efficiency | Remarks |
|---|---|---|---|---|---|---|---|---|---|---|---|---|---|---|---|---|
| 4 | 22.04 | 35 | 10 | 1.52 @ oil miscella | 21.23 | 75 | 9.2 | 64.16 | 35 | 10 | FH | 5.19 | 75 | 3.9 | 85.65 | |
| 5 | 22.04 | 35 | 10 | 1.52 @ oil miscella | 21.14 | 75 | 9.93 | 61.00 | 35 | 10 | FH | 5.39 | 75 | 3.19 | 88.34 | |
| 6 | 22.04 | 35 | 10 | 1.52 @ oil miscella | 22.16 | 75 | 9.73 | 61.87 | 35 | 10 | FH | 4.98 | 75 | 2.98 | 89.14 | |
| 7 | 22.04 25.4 | 35 | 10 | 1.52 @ oil miscella | 22.09 | 75 | 8.88 | 65.53 | 35 | 10 | FH | 4.4 | 75 | 3.14 4.4 3.35 | 88.53 | Independent lab PVO |
| 8 | 22.04 | 38 | 10 | 5.3 @ oil miscella | 23.44 | 75 | 9.16 | | 38 | 10 | FH | 5.33 | 75 | 3.07 4.4 5.4 | | Independent lab PVO |
| 9 | 22.04 | 35 | 10 | FH | After first filter, washed with Hexane until the miscella free of oil (4 times) | | | | | | | | | 0.4 1.2 2.32 | | Oriental Option # 5 Independent lab PVO |

The fatty acid distillate extracted from SBE utilizing the method described above yields a distillate with the specifications as shown in Table 3.

TABLE 3

Industrial Grade Palm Oil (IGPO) is a Refined, Degummed and Deodorized Oil

| Specification Properties | | Test Method |
|---|---|---|
| M&I % | 0.5 | AOCS Ca 2C-25 |
| | | AOCS Ca 2b-38 |
| FFA WT % (MAX) | 3.0 | AOCS Ca 5a-40 |
| SMP DEG C (MAX) | 38.0 | AOCS Cc 1-25 |
| IV (WIJ'S METHOD) | 47–54 | AOCS Cd 1-25 |
| SAPONIFICATION VALUE | 200 +/−5 | AOCS TI 1a-64 |
| LOVIBOND 51/4" CELL (MAX) | 3OR, 6OY | |
| PEROXIDE VALUE (MAX) | 4 | AOCS Cd 8-53 |

| TYPICAL FATTY ACID COMPOSITION, GLC, wt % | |
|---|---|
| C12:0 | 1.9 |
| C14:0 | 1.6 |
| C16:0 | 39.4 |
| C16:1 | 0.1 |
| C18:0 | 7.1 |
| C18:1 | 38.3 |
| C18:2 | 9.9 |
| C18:3 | 0.5 |

Packing

Road tankers/Bulk/Steel drums

What is claimed is:

1. A process to recover oil from spent bleaching earth recovered from vegetable oil refining process characterized in that the process comprises:

(i) treating the spent bleaching earth with a solvent selected from a group consisting of tuolene, acetone, xylene, isopropyl alcohol or n-hexane at a temperature between 35° C. to 50° C. to form a slurry;
   (ii) separating the solid and the liquid fractions from slurry formed in step (i) by
   (A) separating the mixture of solids and the liquid into a first solid fraction and a first liquid fraction;
   (B) treating the first solid fraction from step (A) with at least one of said solvents to form a second mixed second solid fraction and second liquid fraction; and
   (C) separating the second mixed solids and the liquid into a second solid fraction and a second liquid fraction; and
   (iii) extracting vegetable oil from at least one of the liquid fractions obtained in step (ii).

2. A process to recover oil from spent bleached earth as claimed in claim 1 wherein said first liquid fraction contains oil, and further comprising distilling said first liquid fraction to separate the solvent used and the oil.

3. A process to recover oil from spent bleaching earth as claimed in claim 2 wherein the extracted oil is further refined to remove free fatty acids.

4. A process to recover oil from spent bleaching earth as claimed in claim 1 wherein the solids separated in at least one of parts (A) and (C) of step (iii) is subjected to steam treatment to recover left over solvent associated with the solids.

5. A process to remove oil from spent bleaching earth as claimed in claim 1 wherein the solvent used is n-hexane.

6. Purified spent bleaching earth after the oil has been extracted therefrom by the process claimed in claim 1.

7. Vegetable oil extracted from spent bleaching earth by a process as claimed in claim 1.

8. A process to recover oil from spent bleaching earth as claimed in claim 1 where the vegetable oil is palm oil.

9. Anhydrous clay recovered from spent bleaching earth that has been subjected to the process to recover vegetable oil from spent bleaching earth as claimed in claim 1.

10. A process as claimed in claim 1 wherein the solvent used in steps (i) and (ii); part (B) are the same.

11. A process as claimed in claim 1 further comprising subjecting the solids separated in step (C) to steam treatment in an amount sufficient to cause the recovery of excess solvent that is associated with said solids.

12. A process to recover oil from spent bleaching earth recovered from vegetable oil refining process characterized in that the process comprises:

(i) reacting the spent bleaching earth with n-hexane at a temperature between 35° C. to 50° C. for a period of 15 to 45 minutes at a concentration level of bleaching earth to solvent maintained between 5% to 50% by weight to form a slurry having a liquid content that comprises n-hexane and oil;

(ii) introducing the slurry obtained in step (i) into a slurry settler for settling of solids;

(iii) introducing 30% to 35% by weight of the slurry from the slurry settler to a filter and filtering the slurry through at least one stage to obtain a clear filtrate and a cake of about 70% to 75% dryness;

(iv) distilling the filtrate in step (iii) to separate n-hexane from the oil; and (v) refining the oil recovered from step (iv) to remove the free fatty acids therefrom.

13. A process as claimed in claim 12 further comprising the step of:

(vi) subjecting the cake obtained in step (iii) to a desolventising process comprising heating the cake to a temperature of about 80° C. to 110° C. and recovering n-hexane.

14. A Purified spent bleaching earth after the oil has been extracted therefrom by the process claimed in claim 12.

15. Vegetable oil extracted from spent bleaching earth by a process as claimed in claim 12.

16. A process to recover oil from spent bleaching earth as claimed in claim 12 where the vegetable oil is palm oil.

17. Anhydrous clay recovered from spent bleaching earth that has been subjected to the process to recover oil from spent bleaching earth as claimed in claim 12.

* * * * *

UNITED STATES PATENT AND TRADEMARK OFFICE
CERTIFICATE OF CORRECTION

PATENT NO. : 6,780,321 B2
APPLICATION NO. : 10/188810
DATED : August 24, 2004
INVENTOR(S) : Narain Girdhar et al.

It is certified that error appears in the above-identified patent and that said Letters Patent is hereby corrected as shown below:

On the title page:

Item (57) Abstract, Line 3: "involve" should be --involves--.

Column 1, Line 7: "for" should be --from--.

Column 1, Line 15: "involved" should be --involves--.

Column 1, Line 17: the word --and-- should be added between the words "bleaching" and "deodarization".

Column 1, Line 19: "phophatides" should be --phosphatides--.

Column 1, Line 34: the word --earth-- should be added before the word "thus".

Column 1, Line 39: "of" should be --off--.

Column 1, Line 40: "else" should be --as--.

Column 2, Line 16: "miscelle" should be --miscella--.

Column 2, Line 21: "ten" should be --then--.

Column 2, Line 22: "absorbed" should be --adsorbed--.

Column 2, Line 27: "than" should be --then--.

Column 2, Line 28: "fall" should be --falling--.

Column 2, Line 31: "FM" should be --FFA--.

Column 2, Line 65: "ww" should be --wt--.

UNITED STATES PATENT AND TRADEMARK OFFICE
CERTIFICATE OF CORRECTION

PATENT NO. : 6,780,321 B2
APPLICATION NO. : 10/188810
DATED : August 24, 2004
INVENTOR(S) : Narain Girdhar et al.

It is certified that error appears in the above-identified patent and that said Letters Patent is hereby corrected as shown below:

Column 3, Line 41: "plan" should be --plant--.

Signed and Sealed this

Third Day of July, 2007

JON W. DUDAS
*Director of the United States Patent and Trademark Office*